(12) United States Patent
Maccagni et al.

(10) Patent No.: US 11,667,990 B2
(45) Date of Patent: Jun. 6, 2023

(54) PROCESS FOR RECOVERING LEAD FROM A LEAD PASTEL AND USE THEREOF IN A PROCESS FOR RECOVERING LEAD-ACID ACCUMULATOR COMPONENTS

(71) Applicant: ENGITEC TECHNOLOGIES S.P.A., Novate Milanese (IT)

(72) Inventors: Massimo Giuseppe Maccagni, Sesto San Giovanni (IT); Edoardo Guerrini, Chiari (IT)

(73) Assignee: ENGITEC TECHNOLOGIES S.P.A., Novate Milanese (IT)

( * ) Notice: Subject to any disclaimer, the term of this patent is extended or adjusted under 35 U.S.C. 154(b) by 237 days.

(21) Appl. No.: 16/976,897

(22) PCT Filed: Mar. 6, 2019

(86) PCT No.: PCT/IB2019/051789
§ 371 (c)(1),
(2) Date: Aug. 31, 2020

(87) PCT Pub. No.: WO2019/171282
PCT Pub. Date: Sep. 12, 2019

(65) Prior Publication Data
US 2021/0025026 A1    Jan. 28, 2021

(30) Foreign Application Priority Data
Mar. 8, 2018  (IT) .......................... 102018000003369

(51) Int. Cl.
*C25C 7/02*    (2006.01)
*C25C 1/00*    (2006.01)
(Continued)

(52) U.S. Cl.
CPC .............. *C22B 13/045* (2013.01); *C25C 1/18* (2013.01); *C25C 7/08* (2013.01); *H01M 10/54* (2013.01)

(58) Field of Classification Search
CPC ....... C22B 13/04; C22B 11/04; C22B 13/045; C22B 19/22; C22B 1/08; C22B 3/10; C25C 1/18; C25C 1/00; C25C 7/02
See application file for complete search history.

(56) References Cited

U.S. PATENT DOCUMENTS

| 4,229,271 A | 10/1980 | Prengaman et al. |
| 5,151,196 A | 9/1992 | Paul et al. |

(Continued)

FOREIGN PATENT DOCUMENTS

| CN | 101918600 A | 12/2010 |
| CN | 104141045 A | 11/2014 |

(Continued)

OTHER PUBLICATIONS

Fischer, H. et al., "Hydrometallurgische Aufarbeitung Bleisulfathaltiger Vorstoffe," Metall, Metall Verlag, vol. 34, No. 8, Aug. 1, 1980, XP 002041785, pp. 716-722.

(Continued)

*Primary Examiner* — Zulmariam Mendez
(74) *Attorney, Agent, or Firm* — Oblon, McClelland, Maier & Neustadt, L.L.P.

(57) ABSTRACT

The present invention concerns a process for the recovery of lead from a lead pastel electrolytically, where the pastel contains lead sulfate. The process provides for the leaching of the non-desulfurised pastel and the subsequent removal of the sulfates by precipitation; the leachate containing the lead ions is then subjected to electrolysis for the recovery of metal lead. The present invention further relates to a process for the recovery of lead accumulator components, wherein (Continued)

the lead contained in the pastel of the accumulators is recovered according to the aforesaid process.

13 Claims, 2 Drawing Sheets

(51) Int. Cl.
*C22B 3/00* (2006.01)
*C25C 1/18* (2006.01)
*C25C 7/08* (2006.01)
*H01M 10/54* (2006.01)

(56) References Cited

U.S. PATENT DOCUMENTS

| | | | |
|---|---|---|---|
| 5,944,869 A | 8/1999 | Modica et al. | |
| 2011/0083970 A1 | 4/2011 | Olper et al. | |

FOREIGN PATENT DOCUMENTS

| | | | |
|---|---|---|---|
| CN | 105274565 A | 1/2016 | |
| CN | 106676270 A | 5/2017 | |
| CN | 106746016 A | 5/2017 | |
| CN | 107641714 | 1/2018 | |
| EP | 0 812 923 A1 | 12/1997 | |
| IT | 1 239 001 B | 9/1993 | |
| JP | 62-120436 | 6/1987 | |
| JP | 2008-81799 | 4/2008 | |
| WO | WO 2009/068988 A2 | 6/2009 | |

OTHER PUBLICATIONS

International Search Report dated Apr. 9, 2019 in PCT/IB2019/051789 filed on Mar. 6, 2019 citing documents AA-AC, AO-AQ and AW therein, 4 pages.

Combined Chinese Office Action and Search Report dated Aug. 18, 2021 in corresponding Chinese Patent Application No. 20190017722.9 (with English Translation) citing documents AA, AO-AR therein, 23 pages.

Indian Office Action dated Apr. 4, 2022 in Indian Patent Application No. 202047037383, citing document AO therein, 5 pages.

Notification of Reasons for Refusal dated Nov. 8, 2022 in Japanese Application No. 2020-545619 (with Computer Generated English Translation).

PROCESS FOR RECOVERING LEAD FROM A LEAD PASTEL AND USE THEREOF IN A PROCESS FOR RECOVERING LEAD-ACID ACCUMULATOR COMPONENTS

The present invention concerns a process for recovering lead from a lead pastel, i.e. the active lead-based mass of lead-acid accumulators, and the use thereof in a process for recovering exhausted lead-acid accumulator components.

As is known, at the end of their useful lifetime, lead-acid accumulators are subjected to recycling processes for recovering the materials that form the different components thereof. One of the most common recycling processes currently envisages the grinding of exhausted accumulators and the subsequent separation of the ground part into homogeneous fractions of material. The grinding of accumulators is generally performed wet, subject to removing the exhausted electrolyte contained in the accumulators. The exhausted electrolyte substantially comprises an aqueous solution of sulfuric acid containing metal impurities.

In the most evolved form of the process, the material leaving the grinding step is subjected to hydrodynamic and hydrostatic treatments from which it is possible to recover the following fractions of materials:

(a) a lead-based metal fraction comprising material that forms the grids (electrodes) and poles of the accumulators; this fraction is substantially formed by lead alloys (e.g. alloys with Sn and Ca);

(b) a fraction of polymeric materials deriving from the outer casings of accumulators, which is mainly made of polypropylene;

(c) a fraction of polymeric materials deriving from the separators of the accumulators, which is mainly made of polyethylene and possibly a smaller component of PVC;

(d) a lead pastel, i.e. the active mass of the accumulators on which, during use, the charging and discharging processes take place; the pastel is mainly made of lead sulfate ($PbSO_4$), lead oxides (in particular $PbO_2$ and $PbO$) and metallic Pb, as well as smaller quantities of other elements (e.g. Sb, Ca, Bi, etc.)

Examples of recovery processes for the components of exhausted lead-acid accumulators are described in U.S. Pat. No. 1,769,116 and US 2006/0018819 A1.

The recovery of the lead contained in fractions (a) and (d) has to date mainly been performed through pyrometallurgical processes, which envisage melting the lead fraction in reducing conditions to obtain metal lead. In some pyrometallurgical processes, sulfur is removed from the pastel before it is fed, together with the metallic fraction, to the melting furnace. Desulfurisation aims to prevent the formation of gaseous effluents containing sulfur oxides (mainly $SO_2$), which would require expensive purification treatments or the addition of additives when loading the furnace to allow the sulfur to be fixed in the melting slag. The desulfurisation of the pastel performed before melting the lead fraction further reduces the fuel consumptions of the furnace and the amount of slag produced in the melting process.

The pastel desulfurisation process can be performed in different ways. In one embodiment, the pastel is placed to react in water with an excess of an alkaline compound so as to solubilise the sulfur in the water, obtaining an aqueous solution containing sulfate ions, and a solid mass comprising the desulfurised pastel. The most commonly used alkaline compounds are aqueous solutions of $NaOH$, $Na_2CO_3$, $NaHCO_3$ and $NH_4HCO_3$.

The desulfurisation processes of the state of the art imply high consumptions of chemical reactants and energy. Typically, the sodium sulfate solution obtained from the desulfurisation of the pastel is subjected to a purification treatment to remove the metallic impurities and, subsequently, to crystallisation for obtaining sodium sulfate anhydrous as a final product of commercial value. However, the crystallisation process, implying the evaporation of high volumes of water, implies high energy consumptions and expensive plant management. Further drawbacks connected with the recovery of sulfur in the form of sodium sulfate anhydrous are then connected with the need to provide suitable storage spaces in the plant for this product and its low commercial value. The use of ammonium salts for the desulfurisation of the pastel as an alternative to the aforesaid alkaline compounds leads to the formation of an ammonium sulfate residue, which being able to be used as fertilizer has greater commercial value than sodium sulfate. However, the use of ammonium salts does not solve the problem of the energy consumptions connected with the crystallization step, which is always necessary.

In order to overcome the critical issues of pyrometallurgical systems, some processes have been proposed for the recovery of lead from accumulators, which do not include melting steps of the lead fraction consisting of the pastel. In general, these processes envisage the leaching of the lead pastel to form a leachate containing lead ions, followed by a subsequent electrochemical treatment on the leachate to recover metal lead (e.g. electroplating).

Even known processes for the recovery of lead from pastel based on electrochemical systems envisage the performance of a preliminary desulfurisation step on the pastel. Desulfurisation makes it possible to prevent the dissolution of the sulfate ions in the leachate, together with the lead ions. The presence of sulfate ions in the leachate can cause various drawbacks in the liquid circulation circuit in the electrolytic system, in particular at the surfaces of the heat exchangers, where encrustations can form following the precipitation of sulfate salts, in particular calcium sulfate in the form of anhydrite. The removal of such encrustations, which are substantially insoluble also in the mineral acids that can be used in the plant without compromising the process is rather difficult and generally requires the use of water jets at very high pressures (even up to a few hundred bar).

An example of a lead recovery process based on electrochemical systems is described in WO 2009/068988 (Engitec Technologies S.p.A.). In this process, the preliminary desulfurisation step is performed by treating the lead pastel with an aqueous solution of ammonium carbonate to produce a desulfurised pastel and an aqueous solution of ammonium sulfate, which is subsequently subjected to crystallisation. The desulfurised pastel is then subjected to leaching in an aqueous solution of ammonium chloride, obtaining a leachate containing lead ions and an insoluble residue.

The leachate containing the lead ions is then subjected to a continuous electroplating treatment with the aid of an electrolytic cell able to guarantee a flow of electrolyte at relatively high speed (up to 2-3 m/s), so as to allow easy detachment of the lead deposited on the cathode. Although resorting to a flow of electrolyte at high speed to guarantee the detachment and recovery of the electroplated lead is an effective expedient, it implies considerable energy consumptions, having to use pumping systems with high head for the electrolytic solution.

WO 2016/183428 describes a process for recovering lead from the pastel of a lead-acid accumulator based on electrochemical treatments. The process envisages a preliminary desulfurisation step in which the pastel is treated with a base (e.g. NaOH), obtaining a desulfurised pastel and a solution containing sulfate ions (e.g. $Na_2SO_4$). The desulfurised pastel is leached with an alkane sulfonic acid, obtaining a solution containing lead ions, which is subsequently treated electrolytically to recover metal lead and regenerate the alkane sulfonic acid. The solution containing the sulfate ions is instead subjected to an electrolytic salt splitting treatment, producing an aqueous solution of $H_2SO_4$ and a regenerated base. Although such a desulfurisation process prevents the production of a sulfate salt residue to be disposed of and the related purification and crystallisation units, it has the drawback of having to provide an additional electrolytic treatment (i.e. salt-splitting) with the consequent increase in energy consumptions. Salt-splitting units are also just as expensive, sensitive to impurities and require special attention and continuous control of the perm-selective membranes, that can even deteriorate rapidly.

In consideration of the aforesaid state of the art, the Applicant set out to solve the primary objective of providing a process for the recovery of lead from a lead pastel deriving from the recovery of lead-acid accumulators in a simple and effective way and without including any pastel melting operations.

In particular, a first object of the present invention is to provide a process for the recovery of lead from a pastel containing lead sulfate electrolytically, without necessarily having to perform the desulfurisation of the pastel prior to leaching.

A second object of the present invention is to provide a process for the recovery of lead from a lead pastel electrolytically, which is not affected by problems of the formation of highly encrusting deposits along the conduits of the system, due to the precipitation of sulfate salts present in the leachate.

A third object of the present invention is to provide a process for the recovery of lead from a lead pastel electrolytically, which allows high purity metal lead, preferably over 99.99% to be obtained.

A further object of the present invention is also to provide a process for the recovery of lead from a lead pastel electrolytically, wherein the recovery of the metal lead formed at the cathode may be realised simply and with reduced energy consumption.

The Applicant found that the aforesaid and other objects, which will be better illustrated in the following description, can be achieved by a process for the recovery of lead electrolytically wherein the pastel that has not yet been desulfurised is subjected to leaching to produce a leachate comprising sulfate and lead ions. The leachate is then desulfurised by adding quicklime (CaO) and/or hydrated lime ($Ca(OH)_2$), so as to precipitate the sulfate ions in the form of insoluble calcium sulfate. The desulfurised leachate is then subjected to an electroplating treatment to recover high purity metal lead.

The Applicant has observed that by leaching the pastel containing lead sulfate and performing the precipitation of the calcium sulfate after the leaching step it is possible to obtain metal lead electrolytically without resorting to the expensive preliminary desulfurisation operations currently in use in the state of the art, with consequent significant advantages in terms of investment costs and plant management; at the same time, through the aforesaid sequence of leaching operations and subsequent desulfurisation through precipitation of the calcium sulfate it is possible to simply control the formation of encrustations in the circulation circuit of the leachate to be electrolysed. In this regard, it has also been observed that the management of the encrustations generated by the precipitation of insoluble salts from the leachate may be made even more effective by changing the balance of the calcium and sulfate ions remaining in the leachate after the separation of the calcium sulfate precipitate, by adding a precipitating agent to the leachate that can form with the calcium ions less soluble salts than calcium sulfate, but more easily removable (e.g. with the aid of acidic aqueous solutions).

A further advantage of the present invention is that it is possible to obtain high purity metal lead (over 99.99%), by purifying the leachate to be subjected to electrolysis from the metallic ions that may be present, typically silver and copper ions, so as to prevent their co-precipitation at the cathode together with the lead. The removal of the metallic impurities is advantageously performed by cementation, e.g. by placing the leachate in contact with particles of metal lead, preferably recycling a part of the lead produced electrolytically in the same process.

It has also been observed that it is possible to obtain easy removal of the lead from the cathode on which it has become deposited during electrolysis by imparting a vibration on the structure of the cathode itself, e.g. by means of a generator of vibrations at ultrasonic frequencies (e.g. piezoelectric oscillator) connected to the cathode. The vibrations, preferably applied in pulses, cause the periodic detachment of the lead particulate from the cathode. Advantageously, the vibrations can also be imparted to the anode to cause the detachment of the $PbO_2$ that can form on this electrode. The use of vibrations (hereinafter also called "sonication") allows electrochemical cells having a simpler structure to be used, being able to operate with flows of leachate to be electrolysed at relatively lows speeds, with a consequent reduction in the energy consumptions of the leachate supply pumps to the cell, which require less energy-intensive motors.

In accordance with a first aspect, the present invention therefore concerns a process for the recovery of the lead from a pastel containing lead sulfate, which comprises the following steps:

(a) leaching said pastel with an aqueous leaching solution containing chloride ions $Cl^-$ and ammonium ions $NH_4^+$ to produce an insoluble residue comprising $PbO_2$ and a leachate comprising lead ions and sulfate ions;

(b) separating said insoluble residue comprising $PbO_2$ from said leachate;

(c) adding a precipitating agent selected from CaO, $Ca(OH)_2$ and mixtures thereof to said leachate to form a precipitate comprising calcium sulfate and a supernatant comprising lead ions;

(d) separating said precipitate comprising calcium sulfate from said supernatant comprising lead ions;

(e) applying an electrical potential to at least one cathode in contact with said supernatant comprising lead ions to electrolytically produce metal lead and a regenerated leaching solution containing chloride ions $Cl^-$ and ammonium ions $NH_4^+$.

According to a second aspect, the present invention concerns a process for the recovery of lead-acid accumulator components comprising the following steps:

grinding said accumulators and separating at least one lead pastel containing lead sulfate;

recovering the lead from said pastel through the aforesaid lead recovery process.

For the purposes of the present description and of the claims, the verb "to comprise" and all the terms deriving therefrom also include the meaning of the verb "to consist of" and the terms deriving therefrom.

The numerical limits and ranges expressed in the present description and appended claims also include the numerical value or numerical values mentioned. Furthermore, all the values and sub-intervals of a limit or numerical range must be considered to be specifically included as though they had been explicitly mentioned.

Further characteristics and advantages of the present invention will become clear from the following detailed description of the invention in which reference will also be made to the appended figures in which.

Figure 1:
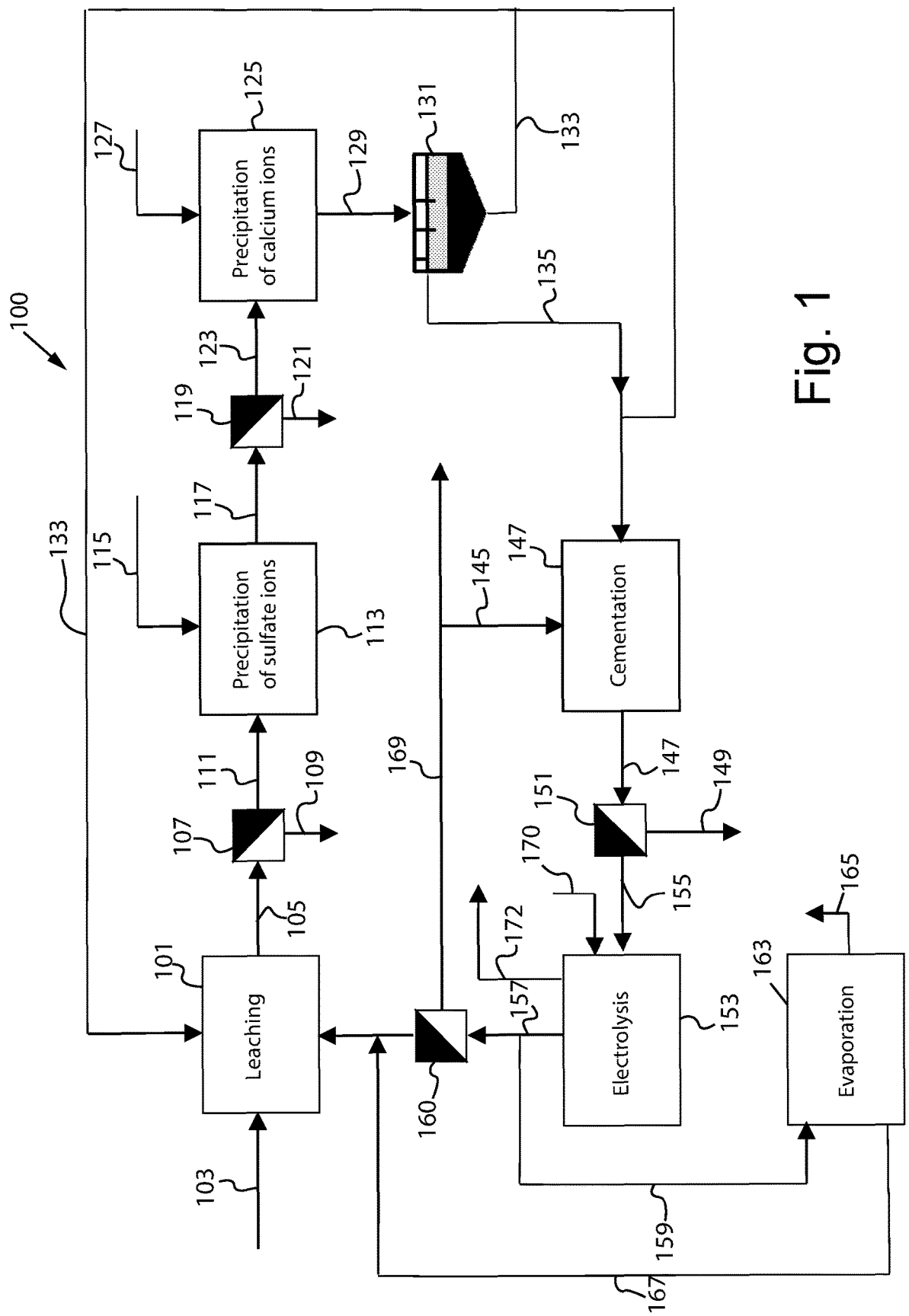
FIG. 1 is a schematic view of an embodiment of the process for the recovery of lead from a pastel containing lead in the form of lead sulfate according to the present invention.

With reference to FIG. 1, an embodiment of the process for the recovery of lead from a lead pastel according to the present invention is described. A system 100 comprises a leaching unit 101 that receives a non-desulfurised lead pastel 103, i.e. a pastel that comprises lead sulfate, not having been subjected to previous desulfurisation treatments. The pastel is substantially formed by the active mass of the accumulators, i.e. the mass on which the charging and discharging processes take place. The pastel mainly comprises lead sulfate and lead oxides, in particular $PbO_2$ and $PbO$. Preferably, the pastel subjected to leaching has a sulfur content greater than or equal to 2% by weight with respect to the weight of the pastel. Preferably, the sulfur content in the pastel is greater than or equal to 4% by weight with respect to the weight of the pastel, more preferably in the range from 5.5% to 7.5% by weight.

In the unit 101 the pastel is placed in contact with a leaching solution comprising $NH_4^+$ ions and $Cl^-$ ions, producing a two-phase reaction product 105 comprising an insoluble residue comprising $PbO_2$, and a leachate containing lead ions and sulfate ions, as well as any other elements in smaller quantities (e.g. calcium ions).

The ammonium and chloride ions are preferably contained in the leaching solution in a variable concentration in the range 100-600 g/l expressed as ammonium chloride. The leaching is preferably performed at a variable temperature from 50 to 110° C.

The leaching of the lead contained in the pastel takes place according to the following reactions:

$$PbSO_4 + 3NH_4Cl \rightarrow NH_4PbCl_3 + (NH_4)_2SO_4 \tag{1}$$

$$PbO + 3NH_4Cl \rightarrow NH_4PbCl_3 + 2NH_3 + H_2O \tag{2}$$

During the leaching step, the lead contained in $PbO_2$ form is not dissolved significantly by the action of the chloride and ammonium ions, thus remaining in $PbO_2$ oxide form in the insoluble residue.

In an alternative embodiment, the pastel is fed to leaching after heat treatment at a temperature in the range of 500° C.-700° C., e.g. for a time in the range of 10-120 minutes. Such thermal treatment leads to the decomposition of the $PbO_2$ according to reaction (4)

$$PbO_2 \rightarrow PbO + \tfrac{1}{2}O_2 \tag{3}$$

and then to the subsequent leaching of the lead contained in the PbO according to reaction (2).

In another preferred embodiment, the pastel can be subjected to leaching in unit 101 in the presence of a reducing agent, e.g. $H_2O_2$, so as to promote the dissolution of $PbO_2$ according to reaction (5):

$$PbO_2 + H_2O_2 \rightarrow PbO + O_2 + H_2O \tag{4},$$

then followed by the dissolution of the PbO according to reaction (2).

The two-phase reaction product 105 is fed to a separation unit 107 in which the insoluble residue 109 is separated from the leachate 111. Such separation can be performed according to known techniques, e.g. by sedimentation, centrifugal separation (e.g. in a hydrocyclone) or by filtration.

The leachate 111 is fed to a precipitation unit of the sulfate ions 113. In this unit, a precipitating agent 115 is added to the leachate 111 selected from among CaO, Ca(OH)$_2$ and mixtures thereof to form a two-phase reaction product 117 comprising a precipitate comprising calcium sulfate (essentially comprised of $CaSO_4 \cdot 2H_2O$) and a supernatant comprising lead ions. The precipitating agent 115 is added in an amount such as to partially or, more preferably, substantially completely precipitate the sulfate ions contained in the leachate. It has in fact been observed that the presence of a residual amount of sulfate ions in the leachate, up to about 3 g/l (expressed as $SO_4^{2-}$ ions), does not however have a negative effect on the subsequent steps of the lead recovery process.

The two-phase reaction product 117 is then sent to a separation unit 119, where the precipitate comprising calcium sulfate 121 is separated from the supernatant 123. It has been observed that the calcium sulfate (gypsum) thus obtained, after drying, is of sufficient purity for use in the building sector.

According to a preferred embodiment, the process according to the invention comprises an optional step of treating the supernatant 123 to at least partially remove the calcium ions mainly deriving from the lime-based precipitation agent introduced into the unit 113 and to a lesser extent from the accumulator components (e.g. grids) and from the use of non-demineralised water in the preparation of the reactants used in the process. The removal of calcium ions is performed in the precipitation unit 125 where a two-phase reaction product 129 is generated, formed by a precipitate comprising an insoluble calcium salt 129 and a supernatant with a reduced content of calcium ions or substantially free from said ions. For that purpose, in the unit 125 at least one precipitating agent 127 is added to the supernatant 123 in a quantity such as to cause the precipitation of at least one insoluble calcium salt. The precipitating agent 127 comprises at least one anion able to form an insoluble calcium salt with the calcium ions still in solution following the precipitation of the calcium sulfate, said calcium salt having a solubility in the supernatant that is lower than that of calcium sulfate. The anion of said precipitating agent is preferably selected from the following anions: oxalate, phosphate, carbonate. Particularly preferred are sodium salts comprising the aforesaid anions. A particularly preferred precipitating agent is sodium oxalate ($Na_2C_2O_4$), which determines the formation of a precipitate of calcium oxalate ($CaC_2O_4$).

The addition of the precipitating agent and the subsequent separation of the insoluble calcium salt formed determines a variation in the molar ratio between the calcium ions and the sulfate ions remaining in solution, thus making the precipitation of calcium sulfate on the surfaces of the plant with the formation of anhydrite encrustations more difficult, e.g. due to the effect of the quick evaporation of the water of the supernatant in contact with the hot surface.

The encrustations on the equipment deriving from the precipitation of insoluble calcium salts different from calcium sulfate (anhydrite), instead, have the advantage of being able to be more easily removed, e.g. by means of acidic aqueous solutions, which are easy to manage and do not damage the plant equipment.

In the separation unit 131 (e.g. a sedimentor), the two-phase reaction product 129 is separated in the precipitate comprising the insoluble calcium salt 133 and in the supernatant 135 free from calcium ions or substantially free from said ions. The precipitate comprising the insoluble calcium salt can be recirculated to the leaching unit 101, so that from here it reaches the separation unit 107 again and is extracted from the process as insoluble residue 109.

The supernatant 135 containing lead ions, before being subjected to the lead electrolysis step, can optionally be purified from any metal ions different from lead and more noble than it (i.e. with greater reduction potential), particularly silver and copper ions, through cementation in the cementation unit 143. As is known, cementation is a reaction through which a first metal is precipitated to the elementary state, from a solution that contains it in ionic form, by addition to the solution of a second metal in the elementary state (precipitating metal) having a lower reduction potential (or more negative) than the reduction potential of the first metal. In unit 143, the silver and copper ions are precipitated in metal form through the addition of metal lead in powder 145, which is in turn transformed into lead ions. The chemical reactions that take place in the cementation step are as follows:

$$Cu(NH_3)_6Cl_2 + Pb + NH_4Cl \rightarrow NH_4PbCl_3 + Cu + 6NH_3 \quad (5)$$

$$2Ag(NH_3)_2Cl + Pb + NH_4Cl \rightarrow NH_4PbCl_3 + 2Ag + 2NH_3 \quad (6)$$

Advantageously, the metal lead particulate 145 used as the precipitating metal is produced in the electrolysis unit 153, downstream of the process.

The dispersion 147 leaving the cementation unit 143 comprises a metal powder comprising silver, copper and lead (unreacted) dispersed in the liquid. This dispersion 147 is separated in a separation unit 151 into a solid phase 149 and a purified solution 155, which can be subjected to electrolysis for the recovery of the lead in the electrolysis unit 153.

The unit 153 comprises at least one electrolytic cell comprising at least one cathode in contact with the purified supernatant 155. The application of an electrical potential to the cathode causes the reduction of the lead ions to metal lead, with the formation of a particulate that tends to adhere to the surface of the cathode. At the same time, with the separation of the metal lead, performed in the unit 160, a regenerated solution of ammonium ions and chloride ions 157 is produced, which can be advantageously used for further leaching pastel in the leaching unit 101.

The regenerated solution 157 is partially recycled to an evaporation unit 163, where a current of vapour 165 is produced. The evaporation allows a portion of water equal to that which was added during the process to be removed from the plant, e.g. as water for diluting the reactants or water for flushing the filter cake. The part of non-evaporated regenerated solution 167 exits from the evaporation unit 163 and is fed to the leaching unit 101 together with the regenerated leaching solution 157.

The lead recovery step by electrolysis can be performed with the techniques and devices known to a person skilled in the art. In general, for that purpose, any technique for the recovery of metals from an aqueous solution containing them can be used, e.g. electroplating or electrowinning.

In a preferred embodiment, the recovery of lead is performed by electroplating, in an electrolytic cell comprising at least one cathode and at least one anode, in the presence of ammonia (FIG. 1, current 170), as described for example in WO 2009/068988 A1 (Engitec Technologies SpA). In these conditions, the reactions that take place at the cathode and at the anode are as follows:

cathode:

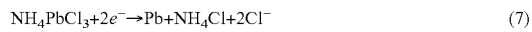

$$NH_4PbCl_3 + 2e^- \rightarrow Pb + NH_4Cl + 2Cl^- \quad (7)$$

anode:

$$2Cl^- \rightarrow Cl_2 + 2e^- \quad (8)$$

The gaseous chlorine that is generated at the anode, in the presence of ammonia, quickly reacts to form hydrochloric acid and nitrogen (FIG. 1, current 172) according to the reaction:

$$Cl_2 + \tfrac{2}{3}NH_3 \rightarrow \tfrac{1}{3}N_2 + 2HCl \quad (9)$$

The overall reaction that takes place in the cell is therefore as follows:

$$NH_4PbCl_3 + \tfrac{2}{3}NH_3 \rightarrow Pb + \tfrac{1}{3}N_2 + NH_4Cl + 2HCl \quad (10)$$

Preferably, the electrolysis process is performed by applying an electric potential difference such as to generate at the electrodes a current having density in the range 50-15,000 A/m2. More preferably, the current applied is high density current, to promote the formation of a lead particulate having a dendritic structure, which adheres less firmly to the cathode and is therefore more easily removable therefrom. Preferably, the current density is in the range 1,000-15,000 A/m2, even more preferably in the range 2,000-10,000 A/m$^2$.

To promote the removal of the lead electroplated onto the cathode, the electrolysis is preferably performed in a flow cell. The flow of electrolyte preferably has a relatively high linear speed, so as to drag the lead particulate out of the cell, as soon as it is formed. Preferably, the linear speed of the flow is in the range 0.1-10 m/s, preferably in the range 1-5 m/s. Rapid removal of lead particulate from the cathode is of crucial importance, as the uncontrolled growth of lead on the cathode can lead to short circuits with the corresponding anode.

In a preferred embodiment of the present invention, a pulse vibration is imparted to the cathode for promoting the detachment from the cathode of the solid lead particles that form during electrolysis. The vibrations can be imparted for example by connecting a generator of vibrations at ultrasonic frequency to the cathode (e.g. a piezoelectric oscillator). The vibrations can be imparted, for example, for a duration of about from 0.5 to 5 seconds, at time intervals of from 30 seconds to 5 minutes.

Advantageously, the vibrations can also be applied to the anode. In fact, during electrolysis, particles of PbO$_2$ can be deposited on the surface of this electrode.

The use of sonication offers various advantages with respect to high speed flow cells. In particular, with respect to the latter, the detachment of lead particles is obtained with significant energy savings, it not being necessary to power the electrolyte with high speed flows. Furthermore, since flows of electrolyte at reduced speed can be used, it is possible to use electrolytic cells with a simpler structure and with electrodes placed at a reduced distance from one another, with consequent energy savings at the same efficiency.

The two-phase product of the electrolysis reaction formed by a dispersion of metal lead particulate in the electrolysed leachate is separated in the unit 160 in a current 169 and a regenerated leaching solution 157. The metal lead 169 exits from the separation unit 160 and is sent to the subsequent processing steps for removing the residual water, e.g. compacting and briquetting operations.

The separation of the two phases that form the two-phase reaction products 117, 129, 147 and 157 in the respective units 119, 131, 151 and 160 can be performed using the techniques previously described for the separation of the insoluble residue 109 from the leachate 105 in the separation unit 107.

Figure 2:
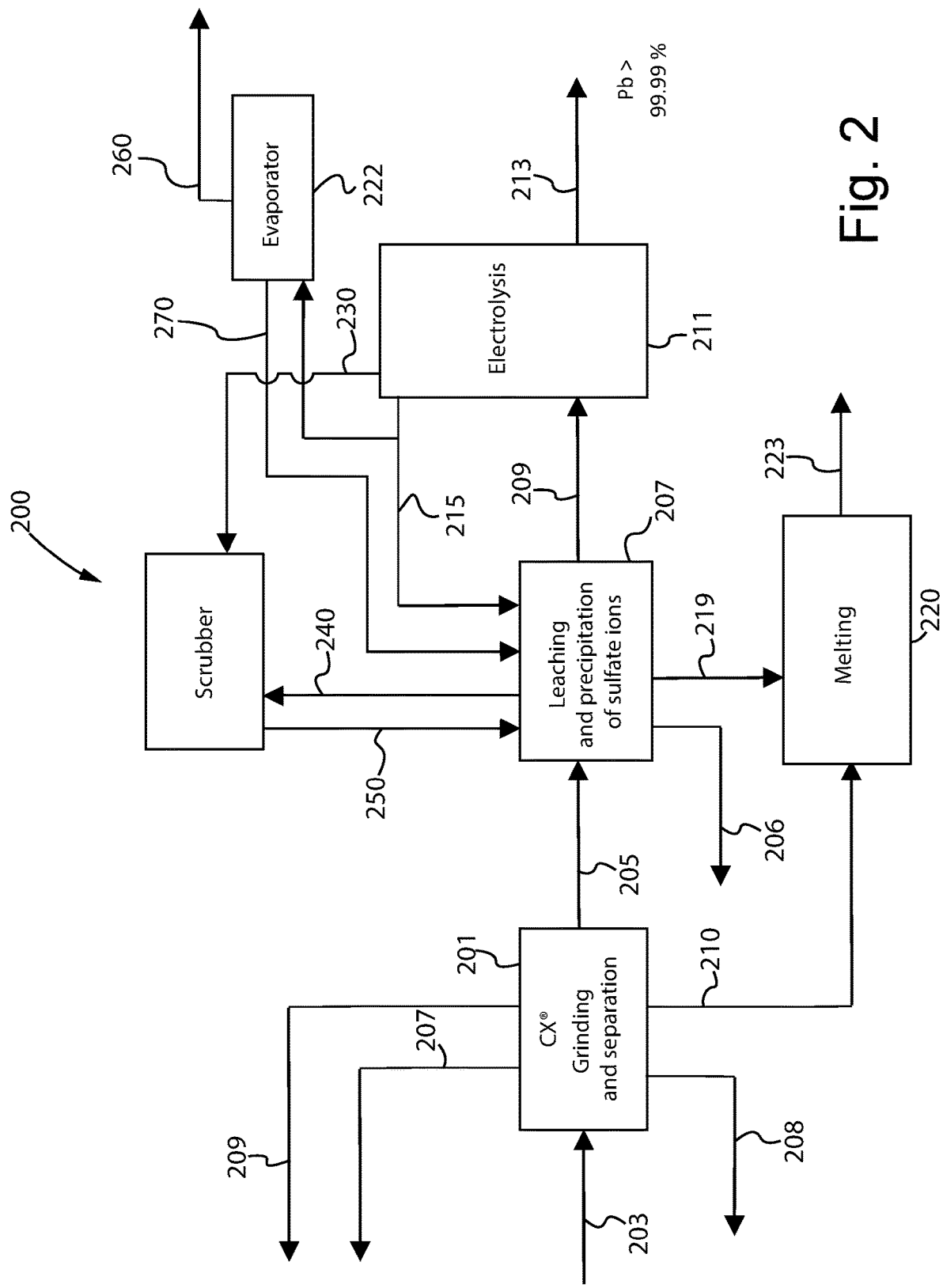
FIG. 2 is a schematic view of an embodiment of the process for the recovery of lead-acid accumulator components in which the process for the recovery of lead from the lead pastel according to the present invention is integrated.

With reference to FIG. 2, a possible embodiment is described of a process for the recovery of lead-acid accumulator components in which the process for the recovery of lead from a lead pastel according to the present invention is integrated.

A system 200 comprising a grinding and separation unit 201 is fed with a plurality of exhausted lead-acid accumulators 203. In the unit 201, exhausted accumulators are subjected to grinding and a subsequent hydrodynamic/hydrostatic separation step from the ground fraction to obtain: a fraction 205 comprising the lead pastel; a fraction 207 comprising the separators made of polymeric material (mainly polyethylene and PVC); a fraction 209 comprising the polymeric material of the outer casings of the batteries, mainly polypropylene; a lead fraction 210 comprising the metal lead based materials, mainly the grids and poles of the batteries; and a fraction 208 comprising the electrolyte (aqueous solution of $H_2SO_4$), which is separated from the accumulators before grinding.

The pastel 205 is fed to a lead recovery process according to the present invention. In particular, the pastel 205 is sent to the preliminary leaching and subsequent desulfurisation steps through the precipitation of the sulfate ions in the unit schematically shown by the block 207 in FIG. 1. In the block 207, a leachate 209 containing lead ions and substantially free from sulfate ions, a precipitate 206 of insoluble sulfate (gypsum), and a final insoluble leaching residue 219 are produced. The lead fraction 210 and the final insoluble residue 219 are fed to a melting unit 220, where the metal lead 223 is recovered by melting in a reducing environment.

The desulfurised leachate 209, which has also possibly been treated for precipitating the calcium ions and/or for eliminating the silver ions and the copper ions, is fed to the electrolytic lead recovery step in the electrolysis unit 211. In the unit 211 the metal lead 213 is separated from the leachate subjected to electrolysis, which is recirculated as regenerated leaching solution 215 to the leaching and precipitation unit 207 of the sulfates 207.

The system 200 is advantageously completed by a small acidulated water scrubber 221, to which the possible leaks of ammonia from the equipment are conveyed (e.g. current 230 from the electrolysis unit 211 and current 240 from the leaching unit 207 and precipitation of the sulfate ions) to form an aqueous ammonia solution that can be recovered in the process (e.g. current 250 fed to the unit 207).

The system 200 further comprises an evaporator 222 that has the purpose of maintaining the balance of the water, by eliminating in the form of vapour (current 260) the excess water that has accumulated during the process. For that purpose, for example, a part of the regenerated leaching solution 215 is fed to the evaporator 222, which after evaporation is recirculated to the leaching and precipitation unit 207 of the sulfate ions. It is to be noted that the evaporator 222 is significantly smaller than the evaporators used in the crystallisation apparatuses of desulfurisation processes known in the state of the art.

It is clear, from the above description, that the present invention allows significant advantages to be obtained with respect to conventional lead recovery processes both through thermal and electrolytic techniques.

With respect to recovery processes through thermal techniques, the present invention allows the processing steps with the biggest impact on the environment and higher operating costs, i.e. desulfurisation, melting of the desulfurised pastel and purification of the sodium sulfate (or ammonium sulfate) solution to be eliminated. This implies a significant reduction in the number of pieces of equipment used for the protection of the working environment and the prevention of environmental pollution, in particular purification systems for the gaseous effluents generated by the melting processes. The recovery process of the accumulator components based on the recovery of lead electrolytically according to the present invention also allows the optimisation of the movement of materials (accumulators, reactants, etc.) inside the accumulator recovery plant, with the consequent minimisation of the generation of dust that causes fugitive emissions and problematic conditions in the working environment. Furthermore, as the electrochemical unit can be managed by means of a computerised system and it not being necessary to remove the cathodes from the electrolysis unit for the recovery of lead, the conduction and monitoring of the process require the use of a much smaller workforce.

With respect to processes based on electrolytic recovery, the present invention offers various advantages, in particular: simplification of the desulfurisation process and reduction of the related costs; better control of the formation of encrusting deposits on the surfaces of the plant with which the leachate comes into contact; higher purity of the metal lead recovered, energy savings and greater construction simplicity of the electrolytic system, thanks to the adoption of the sonication system of the electrodes.

An embodiment of the present invention is provided below solely by way of illustrative example, which must not be considered limiting to the scope of protection defined by the appended claims.

EXAMPLE 1

1. Leaching 50 l of leaching solution were fed into a reactor while stirring, said solution containing:

about 250 g/l of $NH_4Cl$, 26.41 g/l of sulfate ions (expressed as $SO_4^{2-}$)

5.16 g/l of $Pb^{2+}$ ions.

The leaching solution was heated to the temperature of 75° C. Then about 970 g of a lead pastel containing 72.4% of lead and 6.55% of sulfur were added to the solution.

The resulting dispersion was stirred for about an hour and then filtered. The supernatant contained:

24.5 g/l of $Pb^{2+}$ ions, 31.7 g/l of $SO_4^{2-}$ ions, 0.72 g/l of $Ca^{2+}$ ions, 5.3 mg/l of $Cu^{2+}$, 1.1 mg/l of $Ag^+$.

The wet filter cake weighed about 136 g and, after drying, it weighed 117 g. The composition of the dried cake was:
4.33% of Pb,
0.09% of sulfur,
3.5% of Sb.
The lead extraction yield was over 99%.

2. Precipitation of the Sulfate Ions

The leachate containing lead ions obtained in point was placed in a reactor for purification from the sulfates. 170 g of CaO were added to the reactor. The dispersion was stirred for about 30 minutes and then filtered, obtaining a supernatant solution containing 26.2 g of sulfate ions and 0.44 g/l of calcium ions and a precipitate formed by a gypsum cake containing traces of unreacted quicklime. The wet precipitate weighed 908 g and, after drying it weighed 469 g. The content of Pb in the precipitated cake was just 15 mg/kg of Pb. The calcium sulfate obtained was then suitable for use in the building sector.

3. Precipitation of Calcium

To shift the balance between calcium ions and sulfate ions, to the solution free from sulfate ions obtained in point 2, 53 g of sodium oxalate ($Na_2C_2O_4$) were added, while continuing to stir the resulting dispersion for 30 minutes. At the end, the dispersion was filtered to separate a precipitate and a supernatant. The supernatant contained calcium ions dissolved in a residual concentration of 0.12 g/l. The precipitate recovered by filtration weighed 68 g wet and, after drying, it weighed 50.5 g.

4. Cementation

The supernatant solution purified from sulfate ions and calcium ions obtained in point 3, containing 5.3 mg/l of copper ions and 1.1. mg/l of silver ions, was fed to a column, of diameter 200 mm and height 600 mm, filled with lead particulate coming from a previous electrolytic treatment cycle of a pastel. The solution was recirculated in the column for some minutes. At the end, the solution was filtered to remove the lead particulate. The concentration of copper ions and silver ions in the filtered solution was: $Cu^{2+}$ ions equal to 0.91 mg/l and $Ag^+$ ions equal to 0.05 mg/l.

5. Electrolysis

The solution obtained in point 4 was subjected to electrolysis in a flow cell with a single titanium cathode of dimensions 50×200 mm and a single titanium anode activated with noble metal oxides. The current density fed to the cathode was equal to 9,800 A/m². A generator of vibrations at ultrasonic frequency was applied to each electrode, which was activated at pulses of 1 second every minute. Thanks to this expedient, it was possible to feed the cell with a flow of electrolyte (leachate) equal to 0.8 m/s. The electrolysis lasted 2 hours and 46 minutes, producing 958 g of Pb. The current yield was 91.3% and the quality of the Pb was greater than 99.993%. The average voltage was 3.03 V with an energy consumption equal to 858 kWh/t deposited Pb. During electrolysis, about 190 g (215 cc) of a 30% $NH_3$ solution were added.

The invention claimed is:

1. A process for recovering lead from a lead pastel comprising lead sulfate, the process comprising:
(a) leaching said lead pastel with an aqueous leaching solution comprising chloride ions $Cl^-$ and ammonium ions $NH_4^+$ to produce an insoluble residue comprising $PbO_2$, and a leachate comprising lead ions and sulfate ions;
(b) separating said insoluble residue from said leachate;
(c) adding a precipitating agent selected from the group consisting of CaO, $Ca(OH)_2$ and mixtures thereof to said leachate to form a precipitate comprising calcium sulfate and a supernatant comprising lead ions;
(d) separating said precipitate from said supernatant; and
(e) applying an electrical potential to a cathode in contact with said supernatant to electrolytically produce metal lead and a regenerated leaching solution comprising chloride ions and ammonium ions $NH_4^+$.

2. The process of claim 1, wherein said supernatant, before being fed to (e), is subjected to the following:
(d1) adding to said supernatant a precipitating agent to form a precipitate comprising a calcium salt, said precipitating agent comprising an anion capable of forming a calcium salt with calcium ions remaining in solution after precipitation of calcium sulfate in (c), said calcium salt having a lower solubility than that of calcium sulfate; and
(d2) separating said precipitate from said supernatant.

3. The process of claim 2, wherein said anion of said precipitating agent is selected from the group consisting of oxalate, phosphate and carbonate.

4. The process of claim 1, wherein said supernatant, before being fed to (e), is subjected to cementation to eliminate at least impurities of copper ions and/or silver ions possibly present using metal lead as a precipitating metal.

5. The process of claim 4, wherein said precipitating metal comprises the metal lead produced in (e).

6. The process of claim 1, wherein said regenerated leaching solution is used in (a) for leaching further lead pastel.

7. The process of claim 1, wherein said electrolysis is performed by applying a current having a current density within a range of 50-15,000 A/m².

8. The process of claim 1, wherein a pulsed vibration is imparted to a structure of said cathode.

9. The process of claim 1, wherein said lead pastel is fed to (a) after being heat-treated at a temperature within a range of 500° C.-700° C.

10. The process of claim 1, wherein (a) is performed in the presence of a reducing agent to promote dissolution of the lead pastel.

11. The process of claim 10, wherein said reducing agent is $H_2O_2$.

12. A process for recovering a lead-acid accumulator component, the process comprising:
grinding a lead-acid accumulator and separating a lead pastel comprising lead sulfate; and
recovering lead from said lead pastel by a recovery process comprising the process of claim 1.

13. The process of claim 12, comprising:
(i) grinding said lead-acid accumulator to obtain a ground product;
(ii) separating the ground product into at least:
a lead fraction comprising said lead pastel that formed an active mass of said lead-acid accumulator, said lead pastel comprising lead sulfate;
a metal fraction comprising a lead alloy that formed a grid and a pole of said lead-acid accumulator; and
a polymeric fraction comprising polymeric material that formed an outer casing and/or a separator of said lead-acid accumulator;
(iii) recovering lead from said lead pastel through said recovery process and co-producing an insoluble residue comprising $PbO_2$; and
(iv) melting said metal fraction and said insoluble residue comprising $PbO_2$ to produce metal lead and/or a lead alloy.

* * * * *